United States Patent
Wang

(10) Patent No.: US 10,210,077 B2
(45) Date of Patent: Feb. 19, 2019

(54) USING MULTIPLE SEQUENCE ALIGNMENT TO IDENTIFY SECURITY VULNERABILITY CODE PATHS

(71) Applicant: International Business Machines Corporation, Armonk, NY (US)

(72) Inventor: Shu Wang, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 25 days.

(21) Appl. No.: 15/158,299

(22) Filed: May 18, 2016

(65) Prior Publication Data

US 2017/0337123 A1    Nov. 23, 2017

(51) Int. Cl.
| | |
|---|---|
| *G06F 9/44* | (2018.01) |
| *G06F 11/36* | (2006.01) |
| *G06F 21/57* | (2013.01) |
| *G06F 8/70* | (2018.01) |
| *G06F 8/75* | (2018.01) |
| *G06F 21/56* | (2013.01) |

(52) U.S. Cl.
CPC .......... *G06F 11/3688* (2013.01); *G06F 8/70* (2013.01); *G06F 8/75* (2013.01); *G06F 21/563* (2013.01); *G06F 21/577* (2013.01); *G06F 2221/033* (2013.01)

(58) Field of Classification Search
CPC ... G06F 8/443; G06F 11/3466; G06F 11/3636
USPC .......... 717/141, 154, 128, 133, 131
See application file for complete search history.

(56) References Cited

U.S. PATENT DOCUMENTS

| | | | |
|---|---|---|---|
| 8,732,676 B1 * | 5/2014 | Kolawa | G06F 11/3684 717/131 |
| 8,745,606 B2 | 6/2014 | Guo et al. | |
| 8,881,293 B1 | 11/2014 | Brucker et al. | |
| 8,966,453 B1 * | 2/2015 | Zamfir | G06F 8/30 714/38.1 |
| 9,128,728 B2 | 9/2015 | Siman | |

(Continued)

FOREIGN PATENT DOCUMENTS

CN    101110378 B    4/2011

OTHER PUBLICATIONS

Huck et al., "Capturing Performance Knowledge for Automated Analysis", 2014.*

(Continued)

*Primary Examiner* — Phillip H Nguyen
(74) *Attorney, Agent, or Firm* — Jeffrey S. LaBaw; David H. Judson

(57) ABSTRACT

A static analysis tool is augmented to provide for enhanced security vulnerability determination from generated code traces. According to this disclosure, a multiple sequence alignment is applied to a set of traces generated by static analysis of application source code. The output of this operation is an alignment result that simplifies the traces, e.g., by representing many common nodes as a single node. In particular, the sequence alignment identifies entries in the alignment result that represent at least one code execution path that multiple traces in the set of traces include. A call graph can then be output that includes the at least one code execution path identified, and that call graph can also be simplified by applying a compression portions of the traces that are used to generate it. Using multiple sequence alignment and simplified call graphs enable a user to identify security vulnerabilities more efficiently.

21 Claims, 8 Drawing Sheets

(56) References Cited

U.S. PATENT DOCUMENTS

| | | | | |
|---|---|---|---|---|
| 2008/0276228 A1* | 11/2008 | Sreedhar | ............. | G06F 11/3608 717/131 |
| 2010/0077381 A1* | 3/2010 | Allen | ................. | G06F 11/3696 717/124 |
| 2012/0084759 A1* | 4/2012 | Candea | ............... | G06F 11/3612 717/126 |
| 2012/0216177 A1* | 8/2012 | Fink | .......................... | G06F 8/77 717/131 |
| 2013/0031531 A1* | 1/2013 | Keynes | .................... | G06F 8/74 717/126 |

OTHER PUBLICATIONS

Ramanathan et al., "Sieve: A Tool for Automatically Detecting Variations Across Program Versions", 2005.*

Striewe et al., "Trace Alignment for Automated Tutoring", 2013.*

Ethar Elsaka, "Automated Software Debugging Using Hybrid Static/Dynamic Analysis" (Year: 2016).*

Robert C. Edgar, "MUSCLE: Multiple sequence alignment with improved accuracy and speed" (Year: 2004).*

Kirat et al., "MalGene: Automatic Extraction of Malware Analysis Evasion Signature" (Year: 2015).*

Li et al., "Motif Extraction with Indicative Events for System Call Sequence Classification" (Year: 2007).*

Livshits et al, "Finding Security Vulnerabilities in Java Applications with Static Analysis," 2005.

Yamaguchi et al, "Modeling and Discovering Vulnerabilities with Code Property Graphs," 2014 IEEE Symposium on Security and Privacy.

Chen et al, "Multiple Sequence Alignment and Artificial Neural Networks for Malicious Software Detection," 2012 8th International Conference on Natural Computation (ICNC 2012).

* cited by examiner

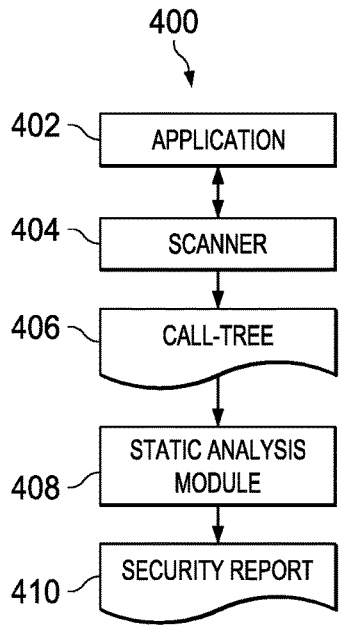

<AsmntFile file_id="174">
<AssessmentStats class total="1" date="1404693251" duration="0" error status="0" language type="2" line total="287" method_total="3" total_call_sites="98" total_call_sites_informational="0" total_call_sites_not_vulnerable="54" vdensity="35104.166667"/>
<Finding data_id="673"/>
<Finding data_id="1204" entity_site_id="2325" trace="276,2061.,2447." urls="66"/>
<Finding data_id="1205" entity_site_id="2325" trace="276,2061.,2448." urls="66"/>
<Finding data_id="1206" entity_site_id="2325" trace="276,2061.,2449." urls="66"/>
<Finding data_id="1207" entity_site_id="1996" trace="279,3095,1837...,3148.,2450" urls="66"/>
<Finding data_id="1207" entity_site_id="2005" trace="279,3095,1846...,3148.,2450" urls="66"/>
<Finding data_id="1208" entity_site_id="1938" trace="277,2635,1780...,2451." urls="66"/>
<Finding data_id="1209" entity_site_id="2236" trace="278,1993,2452." urls="66"/>
<Finding data_id="1210" entity_site_id="2325" trace="278,2061,2453." urls="66"/>
<Finding data_id="1211" entity_site_id="1996" trace="279,3095,1837...,2454." urls="66"/>
<Finding data_id="1212" entity_site_id="2236" trace="278,1993,2455." urls="66"/>
<Finding data_id="1213" entity_site_id="1997" trace="279,3095,1838...,2456." urls="66"/>
<Finding data_id="1214" entity_site_id="1998" trace="279,3095,1839...,2457." urls="66"/>
<Finding data_id="1215" entity_site_id="1999" trace="279,3095,1840...,2458." urls="66"/>
<Finding data_id="1216" entity_site_id="2001" trace="279,3095,1842...,2459." urls="66"/>
<Finding data_id="1217" entity_site_id="2000" trace="279,3095,1841...,2460." urls="66"/>
<Finding data_id="1219" entity_site_id="2325" trace="276,2061,2462." urls="66"/>
<Finding data_id="1220" entity_site_id="2004" trace="279,3095,1845...,2463." urls="66"/>
<Finding data_id="1221" entity_site_id="2325" trace="276,2061,2464." urls="66"/>

|   | A | B | C | D | E | F | G | H | I |
|---|---|---|---|---|---|---|---|---|---|
| 1 | 276 | 2061 | 2447 | | | | | | |
| 2 | 276 | 2061 | | 2448 | | | | | |
| 3 | 276 | 2061 | | | 2449 | | | | |
| 4 | 276 | 2061 | | | | 2453 | | | |
| 5 | 276 | 2061 | | | | | 2462 | | |
| 6 | 276 | 2061 | | | | | | 2464 | |
| 7 | 276 | 2061 | | | | | | | 2465 |

FIG. 7

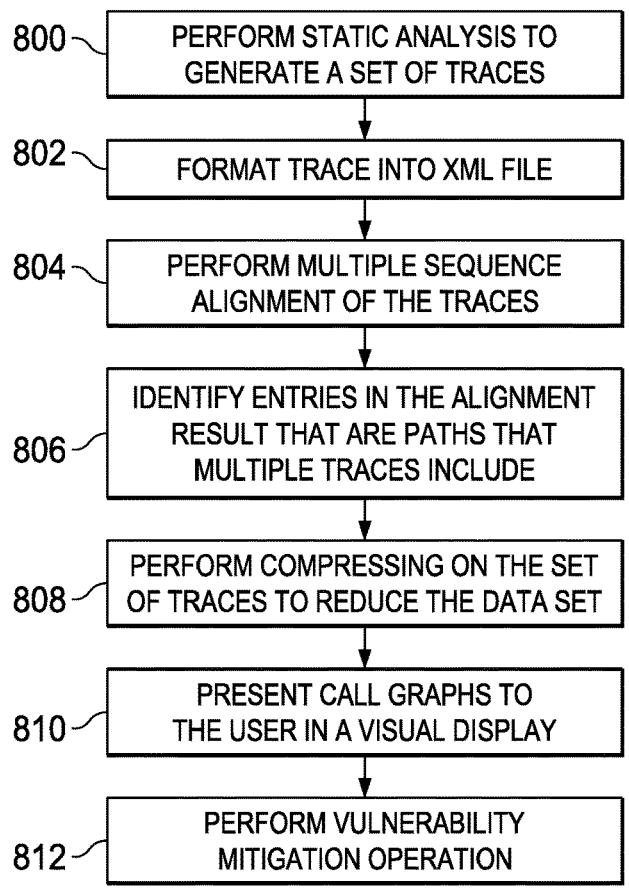

800 — PERFORM STATIC ANALYSIS TO GENERATE A SET OF TRACES

802 — FORMAT TRACE INTO XML FILE

804 — PERFORM MULTIPLE SEQUENCE ALIGNMENT OF THE TRACES

806 — IDENTIFY ENTRIES IN THE ALIGNMENT RESULT THAT ARE PATHS THAT MULTIPLE TRACES INCLUDE

808 — PERFORM COMPRESSING ON THE SET OF TRACES TO REDUCE THE DATA SET

810 — PRESENT CALL GRAPHS TO THE USER IN A VISUAL DISPLAY

812 — PERFORM VULNERABILITY MITIGATION OPERATION

FIG. 8

USING MULTIPLE SEQUENCE ALIGNMENT TO IDENTIFY SECURITY VULNERABILITY CODE PATHS

BACKGROUND OF THE INVENTION

Technical Field

This disclosure relates generally to identifying and remediating application vulnerabilities using static analysis tools.

Background of the Related Art

Today, most organizations depend on web-based software and systems to run their business processes, conduct transactions with suppliers, and deliver sophisticated services to customers. Unfortunately, many organizations invest little to no effort in ensuring that those applications are secure. Web-based systems can compromise the overall security of organizations by introducing vulnerabilities that hackers can use to gain access to confidential company information or customer data.

To address this deficiency, static analysis tools and services have been developed. Static security analysis (or "static analysis" for short) solutions help organization address web and mobile application vulnerabilities through a secure-by-design approach. This approach embeds security testing into the software development lifecycle itself, providing organizations with the tools they require to develop more secure code. Static analysis tools are often used by computer software developers to provide information about computer software while applying only static considerations (i.e., without executing a computer software application). Such tools simplify remediation by identifying vulnerabilities in web and mobile applications prior to their deployment, generating results (reports and fix recommendations) through comprehensive scanning, and combining advanced dynamic and innovative hybrid analyses of glass-box testing (run-time analysis, also known as integrated application security testing) with static taint analysis for superior accuracy. A representative commercial offering of this type is IBM® Security AppScan®, which enhances web application security and mobile application security, improves application security program management and strengthens regulatory compliance.

Typically, application analysis tools of this type produce security "findings" that summarize security vulnerabilities residing in application source code. A complete set of static security findings typically are modeled as "traces," wherein a trace is a code execution path that starts with a "source" (which is vulnerable to malicious user input), passes through one or more internal nodes, and ends in a "sink" (which has a security impact to an application). After being generated by an analysis engine, these traces typically are then presented in a user interface of the security software. While these techniques provide very useful information to the developer, multiple traces may contain many common nodes that only differ in a small number of nodes. As a result, often the findings are difficult to consume, especially as the number of possible traces becomes very large. In such a circumstance, a user can easily lose focus on which findings should have priority for investigation and mitigation.

BRIEF SUMMARY

A static analysis tool is augmented to provide for enhanced security vulnerability determination from generated code traces. According to this disclosure, a multiple sequence alignment is applied to a set of traces generated by static analysis of application source code. The output of this operation is an alignment result that simplifies the traces, e.g., by representing many common nodes as a single node. In particular, the sequence alignment identifies entries in the alignment result that represent at least one code execution path that multiple traces in the set of traces include. A call graph can then be output (e.g., presented to a user in a visual display) that includes the at least one code execution path identified. According to another feature of this disclosure, the call graph can also be simplified by applying a compression function to the traces. This compression reduces the size of the alignment results, and it also simplifies the call graph representation of the set of traces when visualized in the user interface. Using multiple sequence alignment and simplified (compressed) call graphs in this manner enables a user to more readily identify potential security vulnerabilities that might otherwise be hidden in the raw trace data itself.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 4 is a block diagram illustrating a technique for analyzing vulnerable information flows in an application;

FIG. 5 depicts a portion of a security vulnerability report generated by the SAST tool;

FIG. 7 depicts a portion of the modified version of the report in FIG. 6;

FIG. 8 depicts a process flow of an embodiment of this disclosure in which multiple sequence alignment is applied to raw trace data generated by a static analysis;

DETAILED DESCRIPTION OF AN ILLUSTRATIVE EMBODIMENT

Figure 1:
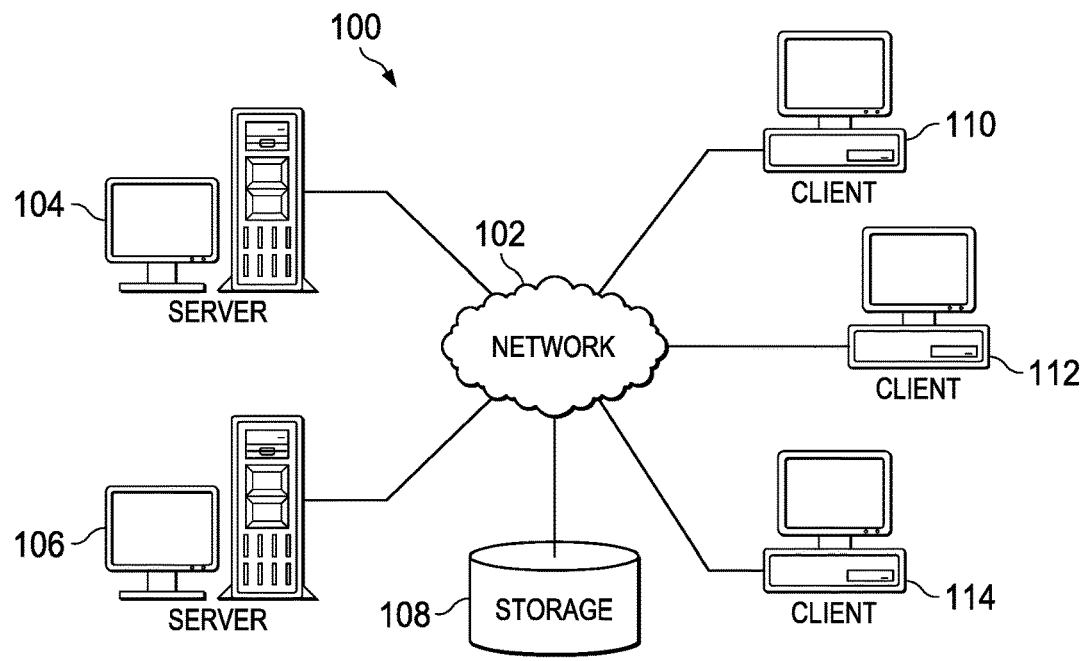
FIG. 1 depicts an exemplary block diagram of a distributed data processing environment in which exemplary aspects of the illustrative embodiments may be implemented.
Figure 2:
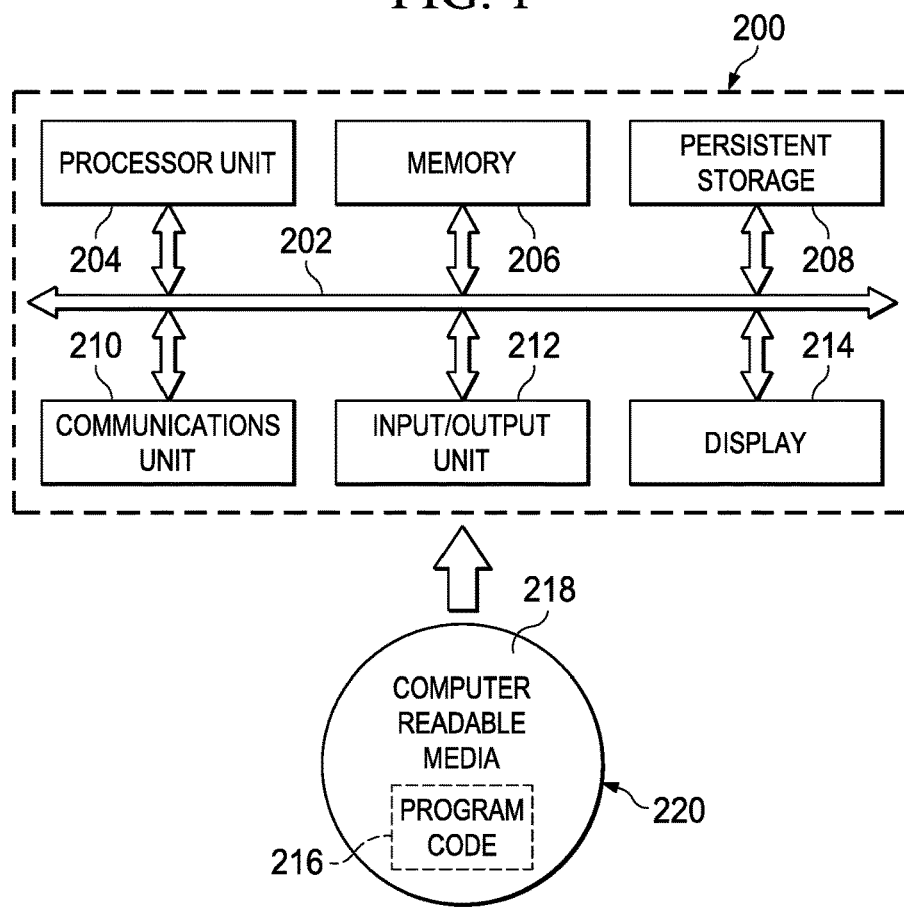
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

Client-server Technologies

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media

218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
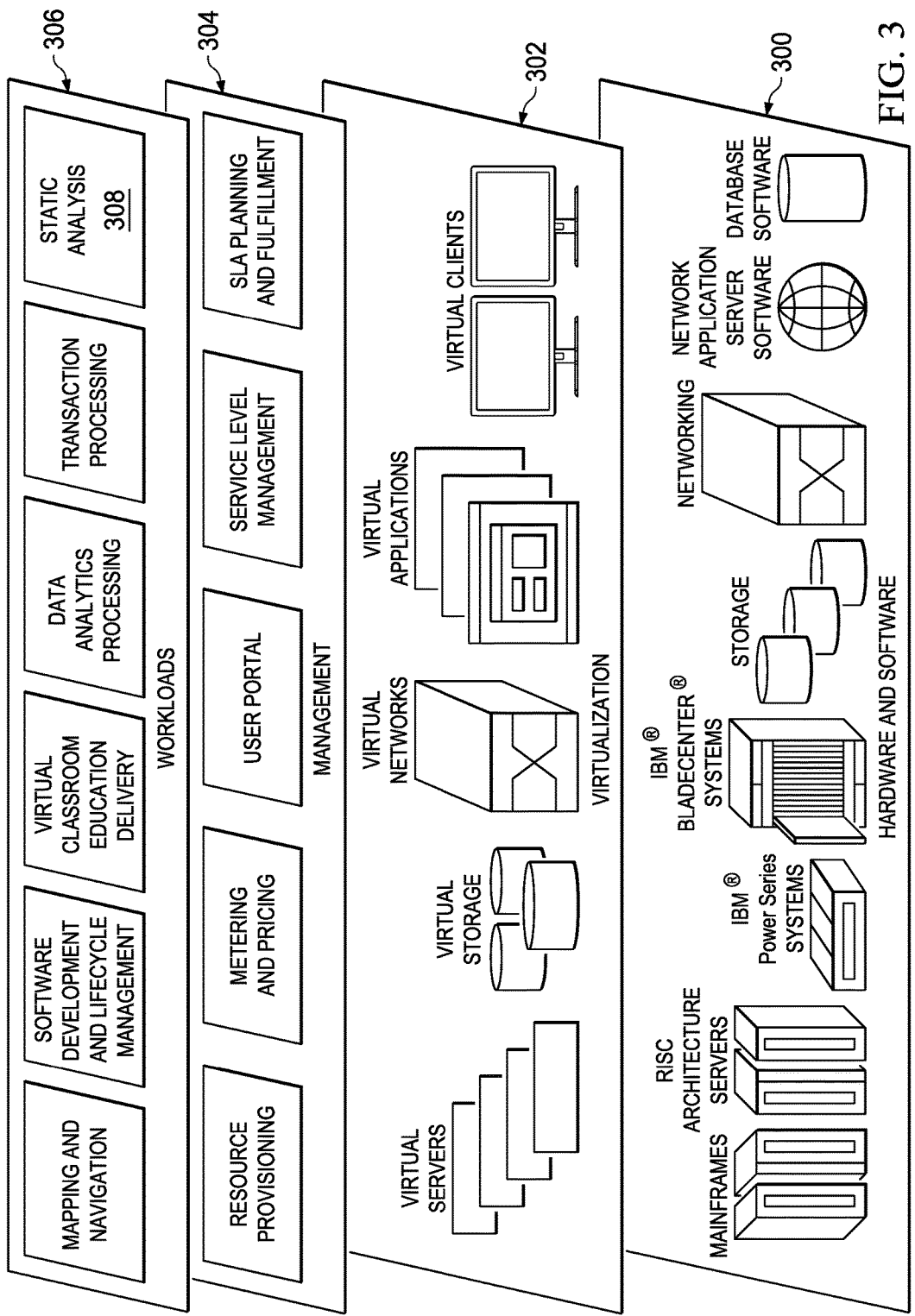
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® System z; RISC (Reduced Instruction Set Computer) architecture based servers, in one example IBM Power Systems; IBM BladeCenter® systems; storage devices; networks and networking components. Examples of software components include network application server software, in one example IBM WebSphere® application server software; and database software, in one example IBM DB2® database software. (IBM, System z, Power Systems, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; enterprise-specific functions in a private cloud; and, according to this disclosure, static security analysis 308.

It is understood in advance that although this disclosure includes a detailed description on cloud computing, implementation of the teachings recited herein are not limited to a cloud computing environment. Rather, embodiments of the disclosed technique are capable of being implemented in conjunction with any other type of computing environment now known or later developed. These include standalone computing environments (e.g., an on-premises desktop machine), client-server-based architectures, and the like.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. Among other tasks, the management server monitors the infrastructure and automatically manipulates the VM placement as needed, e.g., by moving virtual machines between hosts.

In a non-limiting implementation, representative platform technologies are, without limitation, IBM systems as described above with VMware vSphere 4.1 Update 1 and 5.0.

In one embodiment, a static analysis tool, such as IBM AppScan Enterprise Edition, is implemented as a cloud-based application.

Static Analysis Tools and Services

As is well-known, static analysis tools are used by computer software developers to provide information about computer software while applying only static considerations (i.e., without executing a computer software application). More formally, and as used herein, the term "static program analysis" means an analysis of a static representation of an application. In one type of static analysis, data flows are traced within a computer software application from "sources," typically application programming interfaces (API) that introduce "untrusted" input into a program, such as user input, to "sinks," typically security-sensitive operations such as modifying a database. More generally, the term "sink" or "security sink" means a module, function or procedure that consumes in input value and performs an operation on the input value that is security sensitive.

Such flows are identified as security vulnerabilities that may require remediation, typically by ensuring that a flow that is identified as a security vulnerability encounters a "downgrader" that validates and/or sanitizes untrusted input, such as by checking whether the input contains illegal characters or is in an illegal format, both common tactics used in malicious attacks. Generalizing, a "downgrader" refers to a module, routing or function that endorses, sanitizes and/or validates input data. Static analysis tools that identify security vulnerabilities typically provide computer software developers with a short description of each type of security vulnerability found, and may even provide sample code snippets that may be used by the developer to construct a downgrader for remediating the security vulnerability.

In operation, a static program analysis may analyze a call-tree representing previously recorded call stacks of the application to identify security vulnerabilities that may be present in the application. The term "call stack" refers to a stack data structure that stores information about the active subroutines of a computer program, such as an application. Without limitation, the static security analysis typically takes the form of taint analysis, where the analysis is parameterized by a set of security rules, each rule being a triple <Source, San, Sink>, where Source denotes source statements that read untrusted user inputs, San denotes downgrader statements that endorse untrusted data by validating and/or sanitizing it, and Sink denotes sink statements which perform security-sensitive operations. Given a security rule R, any flow from a source in $Source_R$ to a sink in $Sink_R$ that does not pass through a downgrader from $San_R$ comprises a potential vulnerability. This approach thus reduces security analysis to a graph reachability problem.

During static analysis of the computer program, the security analysis application analyses the computer model represented by the control flow call-graph, to determine whether there are potential paths, during execution of the computer program, from the source to the sink without the user-provided data being downgraded by the downgrader. One such path is indicated in the call-graph by an edge. This path generally is undesirable, and may indicate a security vulnerability in the computer program. In this regard, the edge can represent a witness to a security vulnerability, and this witness is then reported as a "finding" to the user.

FIG. 4 is a block diagram illustrating a system 400 for analyzing vulnerable information flows in an application 402. In this known scenario, static analysis is used in addition to a black-box scan. As seen in FIG. 4, while the application 402 executes, the scanner 404 performs a scan of the application and, based on the scan, generates a call-graph 406 representing call stacks arising in the application during processing of test inputs provided to the application 402. The call-graph 406 may be pre-generated or provided from some other data source (e.g., a configuration file). As depicted, the system 400 includes a static analysis module 408 that performs a static analysis of the application 402. Specifically, the static analysis module 408 performs a static analysis of the call-graph 406 in which the call stacks identified by the black-box scanner 404 are recorded. As described above, in this way the static analysis module 408 can identify paths (i.e., flows) in the call-graph 406 that potentially represent security vulnerabilities in the application 402. For example, the static analysis module 408 can generate a security report 410 that indicates such paths as witnesses to security vulnerabilities. Security report 410 can be made to be available to a user in any suitable manner. For example, security report 410 can be presented on a display, presented in a printout, stored to a file, or the like.

Using Multiple Sequence Alignment to Identify Security Vulnerability Code Paths

With the above as background, the subject matter of this disclosure is now described.

As noted above, in a conventional static analysis, the SAST software (such as IBM AppScan Source) takes application source code as input, and performs security analysis. The tool produces results containing one or more security vulnerability findings. This result typically is output into an XML file. FIG. 5 depicts a portion 500 of the raw output of a result file. As can be seen, there are numerous rows of data, with each row representing an individual trace session. In particular, each row corresponds to a call graph, and each call graph typically includes many function calls. Thus, the trace field in the row represents a code execution path in the original application code that was subjected to the static analysis, and each number in the trace field represents a coded function call in a specific location of a specific file. As is self-evident, when this trace information is exposed to the user (e.g., on a user interface, in a printed report, or otherwise), it is very difficult to group similar traces and/or to get a sense of which if any nodes might be more important or even critical in terms of their security implications. Typically, this problem arises because multiple traces may contain many common nodes that only differ in a small number of nodes. As a result, often the findings are difficult to consume, especially as the number of possible traces becomes very large. In such a circumstance, a user can easily lose focus on which findings should have priority for investigation and mitigation.

To address this problem, and according to this disclosure, the SAST software is modified (or augmented) to provide a multiple sequence alignment (MSA) to the traces in the results file. Multiple sequence alignment (MSA) is a known technique, typically used to provide sequence alignment of three or more biological sequences, generally protein, DNA, or RNA. Multiple sequence alignment is often used to assess sequence conservation of protein domains, tertiary and secondary structures, and even individual amino acids or nucleotides. Multiple sequence alignment also refers to the process of aligning such a sequence set. Because three or more sequences of biologically relevant length can be difficult and are almost always time-consuming to align by hand, computational algorithms are used to produce and analyze the alignments. MSAs require more sophisticated methodologies than pairwise alignment because they are more computationally complex. Most multiple sequence alignment programs use heuristic methods rather than global optimization, because identifying the optimal alignment between more than a few sequences of moderate length is prohibitively computationally-expensive.

Figure 6:
FIG. 6 depicts a modified version of the security vulnerability report data of FIG. 5 after the data in the report has been subjected to a multiple sequence alignment.

Using a MSA technique, the traces in the example in FIG. 5 are adjusted, which results in the table as depicted in FIG. 6. Given this alignment, and as compared to the raw plot in FIG. 5, a user can more easily identify one or more paths that multiple traces include and that, as a consequence, might be more critical or otherwise important from a security perspective. While visual alignment such as shown in FIG. 6 is one form of alignment display, it should be appreciated that the result may also be generated and stored programmatically (e.g., as an internal representation with a database or other data store).

FIG. 6 depicts how the alignment results 600 (sometimes referred to as an "alignment result") provide more useful information to the user. Thus, for example, entries with the italicized font ((A1 through B7), (A14 through B23), C14, C16, (L14 through L15), (M14 through M15), etc.) are paths that multiple traces include. Preferably, and according to one embodiment, these paths are then highlighted to the user as having a higher priority (than perhaps other paths) for applying mitigation options or other further security checks that might be desired. The nature of the highlight may vary and may include, for example, different color fonts, different formatting, adding other visual cues or call-outs, or the like.

An additional benefit of the MSA approach is that it enables the raw data to be compressed. Thus, and with the sample alignment as shown, it is also possible to compress part of the trace list, e.g., the entries at (A1: lines 1 through 7) of the table. In this example, these multiple traces can be represented as only one trace, namely: {276, 2061, X, where X is (2447|2448|2449|2453|2462|2464|2465)}, as indicated by the entry in bold. Compression in this manner reduces the size of the result file, and it further simplifies the call graph representation in the user interface.

In operation, the MSA algorithm takes several sequences as input, and outputs an alignment. A mathematical definition for an alignment may be as follows: for each node in those several sequences, the MSA algorithm assigns it a position index i, such that for two nodes in two difference sequences, if they have the same position index i, they are aligned together. Conversely, for each position index i, one can easily retrieve all the nodes in different sequences that get assigned to this position i.

The following provides additional details regarding how the MSA routine may be applied. With reference now to FIG. 7, table 700 shows a set of sequences after alignment. As can be seen in this example, note that all the nodes "276" are assigned to a position A, and all the nodes "2061" are assigned to position B. By this simple data re-organization (involving just an identification of the common nodes), it is easy to determine (e.g., by a simple count) that each of positions A and B might well represent a critical path in terms of security vulnerability due to the large number of nodes assigned to each position. A configurable threshold may be associated with the count to indicate that the position represents a security vulnerability that may require further examination.

Still referring to FIG. 7, a preferred compression technique may work as follows: go through the matrix from left to right; for each position i, if there are more than two (2) nodes aligned to it, create a node with the same number; if there is only one (1) node in position i, combine the adjacent nodes and form an indeterminate node (meaning that the node could be any of the possible numbers). In this example scenario, this compression routine generates the following compressed form to represent the entire matrix: 276, 2061, {2447, 2448, 2449, 2453, 2462, 2464, 2465}. When this trace is displayed (e.g., in a user interface display), only one graph (with an indeterminate node) is necessary instead of the seven graphs that would otherwise be necessary. This is the notion of a simplified call graph.

Generalizing, FIG. 8 depicts a process flow of a representative embodiment. In this approach, a method of static security analysis uses multiple sequence alignment to identify critical or important security vulnerability code paths and simplifies call graphs as follows. The process begins at step 800 in a conventional SAST tool; in particular, in response to receiving an application source code as input, the application source code is analyzed, typically in multiple iterations, to produce a set of traces. As depicted in FIG. 4, and as described above, typically there is one trace per iteration. At step 802, each trace is formatted into and provided as a markup language file (such as XML). At step 804, a multiple sequence alignment (MSA) algorithm is applied to the set of traces in the markup language files to generate an alignment result across the set of traces. At step 806, one or more entries in the alignment result that are paths that multiple traces include are then identified, either programmatically or visually. As noted above, such a path may be a critical path in the application source code. At step 808, a portion of the set of traces are compressed to reduce redundant entries to thereby generate a simplified call graph using the portion compressed. At step 810, the resulting simplified call graph and the identified entries are then presented (output) to a user. At step 812, a vulnerability mitigation operation is implemented with respect to the call execution path identified from the alignment result. This completes the process.

Steps 804 and 806 may be carried out concurrently, or in a reverse order.

Figure 9A:
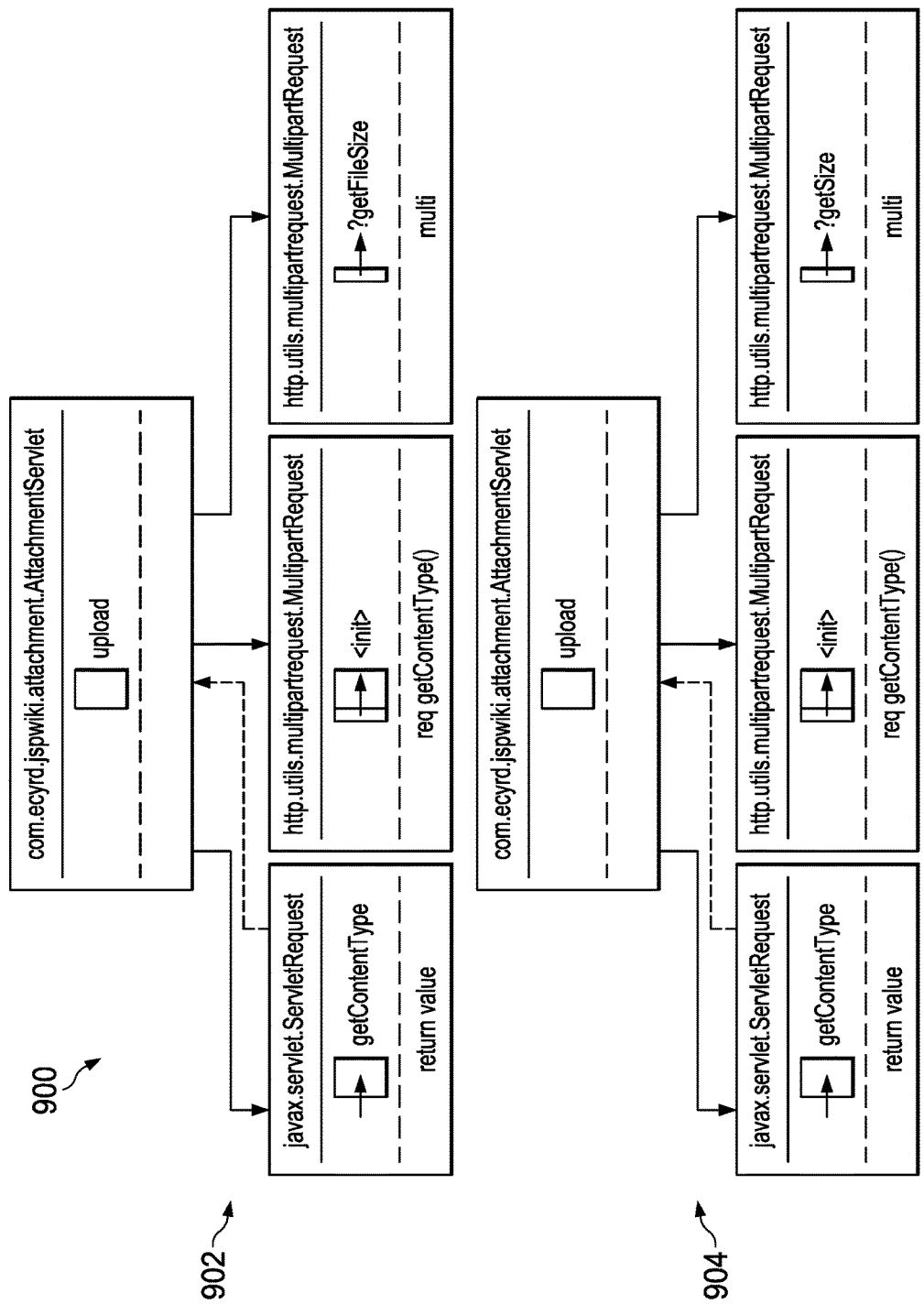
FIGS. 9A-9B depict a call graph output for a known visual display technique.
Figure 9B:
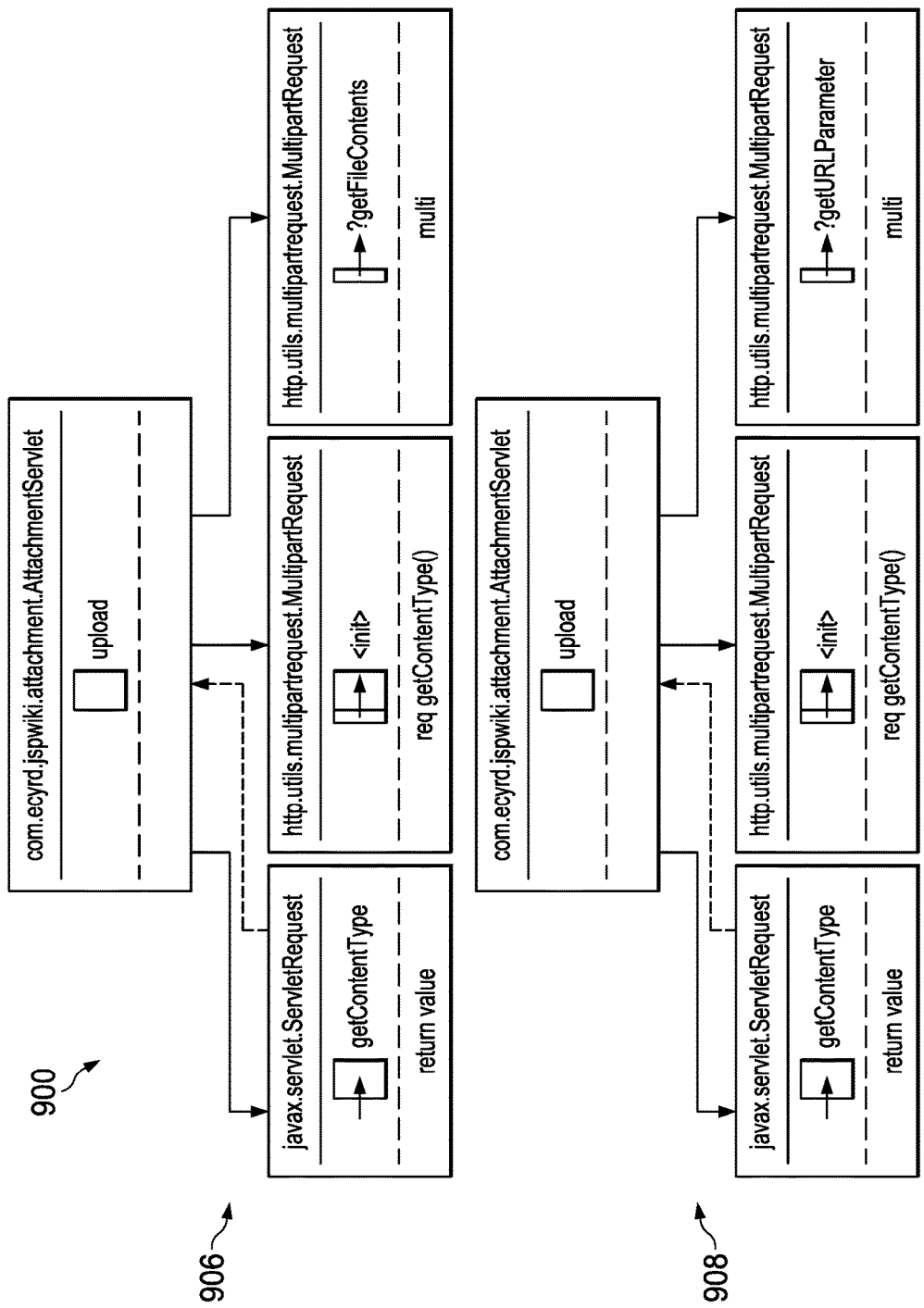
Figure 10:
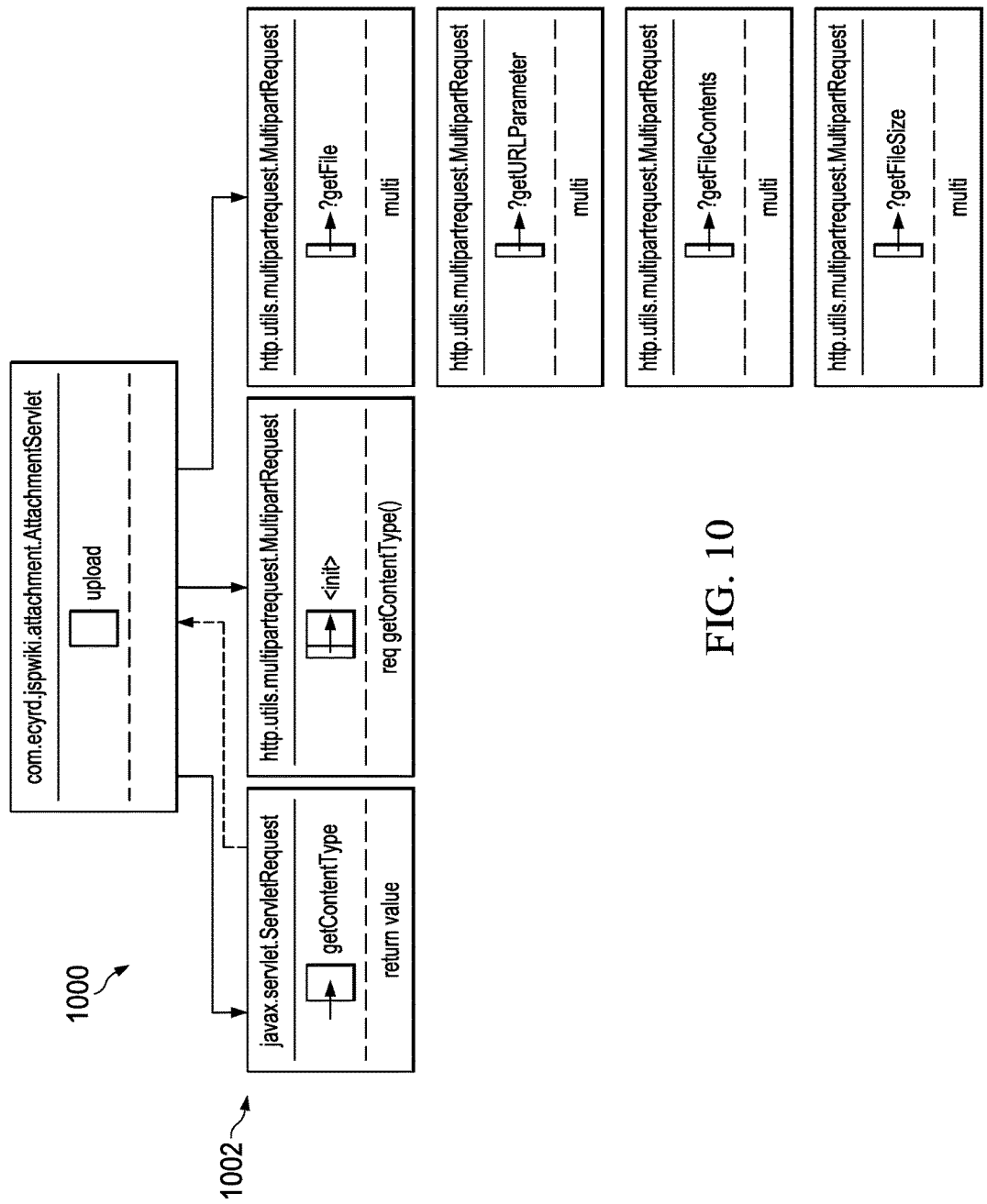
FIG. 10 is a simplified call graph for the multiple call graphs shown in FIG. 9 that is output using the teachings herein.

FIGS. 9A-9B and FIG. 10 further depict how a technique according to an embodiment herein provides for an improved visual display of the trace information generated by the static analysis. In particular, FIG. 9A and FIG. 9B represents the visual display that does not use the approach herein, whereas FIG. 10 represents the visual display using the compression technique. In particular, FIGS. 9A-9B depict a single scan result 900 with four similar call graphs 902, 904, 906 and 908 (with call graphs 902 and 904 in FIG. 9A, and call graphs 906 and 908 in FIG. 9B). Each of these call graphs contains four nodes, but they only differ from one another in the 4$^{th}$ node. In FIG. 10, and in contrast, there is one combined call graph 1000 that contains a combined 4$^{th}$ node 1002 that shows the same information to the user (as in the original) but in a more precise way. As compared to FIGS. 9A-9B, the "simplified call graph" in FIG. 10 is much easier for the user to consume.

The vulnerability mitigation operation may be varied and may include, without limitation, evaluation of the code execution path identified (through visual display or otherwise), testing of the code execution path identified, analysis of the code execution path identified, re-writing of the code execution path, and the like.

The technique described herein provides significant advantages. It enables static analysis findings to be reported in a condensed way (e.g., by enabling one node to represent many common nodes), thereby enabling the user to readily identify places in the code that may need to be analyzed for security vulnerabilities. By using multiple sequence alignment to simplify the traces and compression to simplify the call graphs in the manner described, the user can identify, test and potentially address problems with potentially fault-generating code paths as compared to the brute force examination of the raw trace data that is done in the prior art. Generalizing, the approach herein takes a set of traces and identifies common source code paths that are then examined for potential security vulnerability.

The nature of the multiple sequence alignment that is used may vary. Some MSA algorithms use a combinatorial approach to find optimum alignment, while others use a heuristic or probabilistic technique. A widely used approach to multiple sequence alignments uses a heuristic search known as progressive technique (also known as the hierarchical or tree method). Progressive alignment builds up a final MSA by combining pairwise alignments beginning with the most similar pair and progressing to the most distantly related. Typically, progressive alignment methods require two stages: a first stage in which the relationships between the sequences are represented as a tree, called a guide tree, and a second step in which the MSA is built by adding the sequences sequentially to the growing MSA according to the guide tree. The initial guide tree may be determined by an efficient clustering method.

Another set of methods to produce MSAs are classified as "iterative" because they work similarly to progressive methods but repeatedly realign the initial sequences as well as adding new sequences to the growing MSA. Such methods can use previously calculated pairwise alignments as a means of optimizing a general objective function such as finding a high-quality alignment score. A variety of different iteration methods have been implemented and made available in software packages.

Still another MSA approach is a consensus approach, which attempts to find the optimal multiple sequence alignment given multiple different alignments of the same set of sequences.

Still another MSA approach is Hidden Markov Modeling. HMMs are probabilistic models that assign likelihoods to all possible combinations of gaps, matches, and mismatches to determine the most likely MSA or set of possible MSAs. HMMs can produce a single highest-scoring output but can also generate a set of possible alignments that can then be evaluated. HMMs can produce both global and local alignments. HMM is computationally-efficient, especially for sequences that contain overlapping regions. Typical HMM-based methods work by representing an MSA as a form of directed acyclic graph known as a partial-order graph, which consists of a series of nodes representing possible entries in the columns of an MSA.

Generalizing, the use of a multiple sequence alignment technique in this manner provides a way to optimize traces identified by the static analysis software. Typically, and due to the redundancies in the raw data, traces are optimized by reduction, namely, by taking common nodes into consideration and compressing where possible.

Preferably, the particular multiple sequence alignment technique is selected from a set of multiple sequence alignment techniques, potentially of varying types. The particular MSA technique selected may be determine by a length of the sequence(s) that need to be aligned, which in turn typically depends on the number of function calls that are identified in the particular traces. When the sequence in the trace is short (e.g., up to 5 nodes), it may be desired to select a faster but potentially, less-accurate MSA technique; conversely, when the sequence in the trace is long, preferably a slower, more-accurate MSA technique is selected. Typically, there is a trade-off between processing efficiency and accuracy, and thus the technique may take this factor into consideration is determining which particular MSA technique to use on a particular set of traces.

As a variant, different MSA techniques may be used for different traces in a particular set of traces, although typically an MSA technique is used for each of the traces comprising a set of traces for an application under static analysis.

While MSA is the preferred technique for trace optimization according to this disclosure, other combinatorial techniques (besides MSA) may be used depending on implementation.

The described approach may be implemented in a stand-alone machine executing a SAST tool, or in a tool that is web- or cloud-based.

Preferably, the techniques herein are implemented in associated with a static analysis tool, such as IBM Security AppScan Source. The reference to this commercial product is exemplary and should not be taken to limit the disclosed technique, which may be implemented on any appliance (or, more generally, machine) having the general characteristics and operating functionality that has been described.

This subject matter may be implemented as-a-service. As previously noted, and without limitation, the subject matter may be implemented within or in association with a cloud deployment platform system or appliance, or using any other type of deployment systems, products, devices, programs or processes. As has been described, the generator tool functionality may be provided as a standalone function, or it may leverage functionality from other products and services.

A representative cloud application platform with which the trace optimization and visualization technique may be implemented includes, without limitation, any standalone or cloud-supported Static Application Security Testing (SAST) framework, product or service.

Generalizing, the techniques herein may be implemented as a management solution, service, product, appliance, device, process, program, execution thread, or the like. Typically, the techniques are implemented in software, as one or more computer programs executed in hardware processing elements, in association with data stored in one or more data sources, such as a problems database. Some or all of the processing steps described may be automated and operate autonomously in association with other systems. The automation may be full- or partial, and the operations (in whole or in part) may be synchronous or asynchronous, demand-based, or otherwise.

These above-described components typically are each implemented as software, i.e., as a set of computer program instructions executed in one or more hardware processors. The components are shown as distinct, but this is not a requirement, as the components may also be integrated with one another in whole or in part. One or more of the components may execute in a dedicated location, or remote from one another. One or more of the components may have sub-components that execute together to provide the functionality. There is no requirement that particular functions described be executed by a particular component as named above, as the functionality herein (or any aspect thereof) may be implemented in other or systems.

The multiple sequence alignment functionality can inter-act or interoperate with security analytics systems or services.

As has been described, the functionality described above may be implemented as a standalone approach, e.g., one or more software-based functions executed by one or more hardware processors, or it may be available as a managed service (including as a web service via a SOAP/XML interface). The particular hardware and software implementation details described herein are merely for illustrative purposes are not meant to limit the scope of the described subject matter.

As noted, and in addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the security assurance service (or any component thereof) is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, static security analysis tools and systems, as well as improvements to the functioning of data trace processing techniques generally.

Having described my invention, what I now claim is as follows:

1. A method of static security analysis, comprising:
   performing a static analysis of application source code to generate a set of traces, wherein a trace represents a code execution path in the application source code;
   storing each trace in the set of traces in a markup language file;
   applying a multiple sequence alignment (MSA) to the set of traces in the markup language file to generate an alignment result across the set of traces;
   identifying entries in the alignment result that represent at least one code execution path that is included in a plurality of traces in the set of traces; and
   outputting a call graph that includes the at least one code execution path identified from the alignment result.

2. The method as described in claim 1 further including compressing into a single trace a portion of the set of traces by identifying multiple traces each having a particular node of a code execution path that is not shared across the multiple traces, wherein the single trace has a code execution path that includes at least one indeterminate node comprising values of the particular nodes of the multiple traces.

3. The method as described in claim 2 wherein the call graph includes a portion representing the compressed portion of the set of traces.

4. The method as described in claim 1 further including performing a vulnerability mitigation task associated with the at least one code execution path identified from the alignment result.

5. The method as described in claim 1 wherein the multiple sequence alignment is combinatorial or probabilistic.

6. The method as described in claim 1 wherein the multiple sequence alignment is selected from a set of multiple sequence alignment techniques.

7. The method as described in claim 1 wherein identifying entries in the alignment result includes providing a visual cue that highlights the at least one code execution path.

8. Apparatus, comprising:
   a processor;
   computer memory holding computer program instructions executed by one or more processors for static security analysis, the computer program instructions operative to:
   perform a static analysis of application source code to generate a set of traces, wherein a trace represents a code execution path in the application source code;
   store each trace in the set of traces in a markup language file;
   apply a multiple sequence alignment (MSA) to the set of traces in the markup language file to generate an alignment result across the set of traces;
   identify entries in the alignment result that represent at least one code execution path is included in a plurality of traces in the set of traces; and
   output a call graph that includes the at least one code execution path identified from the alignment result.

9. The apparatus as described in claim 8 wherein the computer program instructions are further operative to compress into a single trace a portion of the set of traces by identifying multiple traces each having a particular node of a code execution path that is not shared across the multiple traces, wherein the single trace has a code execution path that includes at least one indeterminate node comprising values of the particular nodes of the multiple traces.

10. The apparatus as described in claim 9 wherein the call graph includes a portion representing the compressed portion of the set of traces.

11. The apparatus as described in claim 8 wherein the computer program instructions are further operative to facilitate performing a vulnerability mitigation task associated with the at least one code execution path identified from the alignment result.

12. The apparatus as described in claim 8 wherein the multiple sequence alignment is combinatorial or probabilistic.

13. The apparatus as described in claim 8 wherein the multiple sequence alignment is selected from a set of multiple sequence alignment techniques.

14. The apparatus as described in claim 8 wherein the computer program instructions for identifying entries in the alignment result includes computer program instructions further operative to provide a visual cue that highlights the at least one code execution path.

15. A computer program product in a non-transitory computer readable medium for use in one or more data processing systems, the computer program product holding computer program instructions executed by the one or more data processing systems for static security analysis, the computer program instructions operative to:
   perform a static analysis of application source code to generate a set of traces, wherein a trace represents a code execution path in the application source code;
   store each trace in the set of traces in a markup language file;
   apply a multiple sequence alignment (MSA) to the set of traces in the markup language file to generate an alignment result across the set of traces;
   identify entries in the alignment result that represent at least one code execution path that is included in a plurality of traces in the set of traces; and
   output a call graph that includes the at least one code execution path identified from the alignment result.

16. The computer program product as described in claim 15 wherein the computer program instructions are further operative to compress into a single trace a portion of the set of traces by identifying multiple traces each having a particular node of a code execution path that is not shared across the multiple traces, wherein the single trace has a code execution path that includes at least one indeterminate node comprising values of the particular nodes of the multiple traces.

17. The computer program product as described in claim 16 wherein the call graph includes a portion representing the compressed portion of the set of traces.

18. The computer program product as described in claim 15 wherein the computer program instructions are further operative to facilitate performing a vulnerability mitigation task associated with the at least one code execution path identified from the alignment result.

19. The computer program product as described in claim 15 wherein the multiple sequence alignment is combinatorial or probabilistic.

20. The computer program product as described in claim 15 wherein the multiple sequence alignment is selected from a set of multiple sequence alignment techniques.

21. The computer program product as described in claim 15 wherein the computer program instructions for identifying entries in the alignment result includes computer program instructions further operative to provide a visual cue that highlights the at least one code execution path.

* * * * *